US011393168B2

(12) United States Patent
Barbie et al.

(10) Patent No.: US 11,393,168 B2
(45) Date of Patent: Jul. 19, 2022

(54) GENERATING AN ANATOMY BASED ON WEIGHTS OF SELECTED TEMPLATE ANATOMIES

(71) Applicant: ZIVA DYNAMICS INC., Vancouver (CA)

(72) Inventors: Jernej Barbie, Vancouver (CA); Crawford Doran, Vancouver (CA); Essex Edwards, Vancouver (CA); James Jacobs, Vancouver (CA); Yijing Li, Vancouver (CA)

(73) Assignee: Ziva Dynamics Inc., Vancouver (CA)

( * ) Notice: Subject to any disclaimer, the term of this patent is extended or adjusted under 35 U.S.C. 154(b) by 0 days.

(21) Appl. No.: 16/759,307

(22) PCT Filed: Nov. 13, 2018

(86) PCT No.: PCT/CA2018/051436
§ 371 (c)(1),
(2) Date: Apr. 24, 2020

(87) PCT Pub. No.: WO2019/095051
PCT Pub. Date: May 23, 2019

(65) Prior Publication Data

US 2020/0302687 A1 Sep. 24, 2020

Related U.S. Application Data

(60) Provisional application No. 62/586,021, filed on Nov. 14, 2017.

(51) Int. Cl.
*G06T 15/00* (2011.01)
*G06T 17/20* (2006.01)
(Continued)

(52) U.S. Cl.
CPC ............ *G06T 17/20* (2013.01); *G06T 3/4007* (2013.01); *G06T 13/40* (2013.01); *G06T 19/20* (2013.01);
(Continued)

(58) Field of Classification Search
CPC ......... G06T 13/40; G06T 17/20; G06T 19/20; G06T 2207/30196; G06T 2219/2021
See application file for complete search history.

(56) References Cited

U.S. PATENT DOCUMENTS

| | | | |
|---|---|---|---|
| 2008/0180448 A1 | 7/2008 | Anguelov et al. | |
| 2011/0157306 A1 | 6/2011 | Lin et al. | |
| 2018/0130256 A1* | 5/2018 | Wampler | G06T 13/20 |

FOREIGN PATENT DOCUMENTS

| | | |
|---|---|---|
| WO | WO 2016207311 | 12/2016 |
| WO | WO-2019095051 A1 | 5/2019 |

OTHER PUBLICATIONS

Hongyi Xu and Jemej Barbič, "Pose-Space Subspace Dynamics," *ACM Transactions on Graphics* 35(4) (SIGGRAPH 2016), Jul. 2016, 14 pages.

(Continued)

*Primary Examiner* — Charles Tseng
(74) *Attorney, Agent, or Firm* — Schwegman Lundberg & Woessner, P.A.

(57) ABSTRACT

Methods, systems, and techniques for generating a new, animation-ready anatomy. A skin mesh of the new anatomy is obtained, such as by performing a 3D depth scan of a subject. Selected template anatomies are also obtained, with each of those template anatomies having a skin mesh that corresponds with the new anatomy's skin mesh. The skin meshes of the new and selected template anatomies share a first pose. Each of the selected template anatomies also has a skeleton for the first pose and skinning weights, and the skin mesh in at least one additional pose that is different (Continued)

from the first pose and any other additional poses. The method then involves using a processor to interpolate, from the at least one of the skeleton and skinning weights of the selected template anatomies and the first and at least one additional pose of the selected template anatomies, the new anatomy.

18 Claims, 6 Drawing Sheets

(51) Int. Cl.
*G06T 3/40* (2006.01)
*G06T 13/40* (2011.01)
*G06T 19/20* (2011.01)

(52) U.S. Cl.
CPC ............... *G06T 2207/30196* (2013.01); *G06T 2219/2021* (2013.01)

(56) References Cited

OTHER PUBLICATIONS

International Search Report and Written Opinion received in PCT/CA2018/051436, dated Feb. 7, 2019, 9 pages.
Miller, et al., “Frankenrigs: Building Character Rigs from Multiple Sources,” Proceedings of the 2010 ACM SIGGRAPH symposium on Interactive 3D Graphics and Games, pp. 31-38, Feb. 19-21, 2010.
“Skinning: Real-time Shape Deformation”, ACM SIGGRAPH 2014 Course, 1 page.
J. P. Lewis, Matt Cordner, Nickson Fond, “Pose space deformation: a unified approach to shape interpolation and skeleton-driven deformation,” ACM SIGGRAPH 2000, 8 pages.
Eftychios Sifakis and Jernej Barbie, “FEM Simulation of 3D Deformable Solids: A practitioner’s guide to theory, discretization and model reduction,” ACM SIGGRAPH 2012 Courses, 50 pages.
Jernej Barbič, Doug L. James, “Real-Time Subspace Integration for St.Venant-Kirchhoff Deformable Models,” ACM Transactions on Graphics 24(3) (SIGGRAPH 2005), p. 982-990.
Besl, Paul J.; N.D. McKay (1992). “A Method for Registration of 3-D Shapes,” IEEE Trans. on Pattern Analysis and Machine Intelligence. 14 (2): 239-256.
Shepard, Donald, “A two-dimensional interpolation function for irregularly-spaced data,” Proceedings of the 1968 ACM National Conference, pp. 517-524.
Brett Allen, Brian Curless, Zoran Popovic, “The space of human body shapes: reconstruction and parameterization from range scans,” ACM SIGGRAPH 2003, 8 pages.
Dicko Ali-Hamadi, Tiantian Liu, Benjamin Gilles, Ladislav Kavan, Francois Faure, Olivier Palombi, Maric-Paule Cani, “Anatomy Transfer,” SIGGRAPH 2013, 10 pages.
Ken Shoemake and Tom Duff, “Matrix animation and polar decomposition,” Proceedings of the conference on Graphics interface ’92, p. 258-264.
Robert W. Sumner, Jovan Popovic, “Deformation Transfer for Triangle Meshes,” ACM SIGGRAPH 2004, 7 pages.
Liu, Chen, An Analysis of the Current and Future State of 3D Facial Animation Techniques and Systems, MSc Thesis, Simon Fraser University, 2009, 155 pages.
International Application Serial No. PCT/CA2018/051436, International Preliminary Report on Patentability dated May 28, 2020, 7 pgs.

* cited by examiner

GENERATING AN ANATOMY BASED ON WEIGHTS OF SELECTED TEMPLATE ANATOMIES

CROSS REFERENCE TO RELATED APPLICATIONS

This is the U.S. National Stage of International Application No. PCT/CA2018/051436, filed Nov. 13, 2018, which was published in English under PCT Article 21(2), which in turn claims the benefit of U.S. Provisional Application No. 62/586,021, filed Nov. 14, 2017. Both applications are incorporated herein by reference in their entirety.

TECHNICAL FIELD

The present disclosure is directed at methods, systems, and techniques for generating an animation-ready anatomy.

BACKGROUND

Computer models of various creatures, such as humans and animals (these models are "anatomies"), are used in a number of industries. As one example, the visual effects industry regularly uses anatomies when implementing motion picture special effects. As another example, the gaming industry uses anatomies for virtual reality, augmented reality, and mixed reality games. In certain applications, such as in video games and motion pictures, it may also be desirable to animate anatomies' movements.

There accordingly exists a continued need for methods, systems, and techniques for generating animation-ready anatomies.

SUMMARY

According to a first aspect, there is provided a method for generating a new animation-ready anatomy, the method comprising using a processor to: obtain a skin mesh of the new anatomy; obtain selected template anatomies each comprising a skin mesh that is in correspondence with the skin mesh of the new anatomy, wherein the skin meshes of the new and selected template anatomies share a first pose and wherein each of the selected template anatomies further comprises at least one of: a skeleton for the first pose and skinning weights; and the skin mesh in at least one additional pose that is different from the first pose and any other additional poses; and interpolate, from the at least one of the skeleton and skinning weights of the selected template anatomies and the first and at least one additional pose of the selected template anatomies, the new anatomy.

Using the processor to obtain the skin mesh of the new anatomy may comprise using a scanning device to scan an individual to generate the skin mesh, and using the processor to obtain the selected template anatomies may comprise accessing a database storing the selected template anatomies.

The method may further comprise using the processor to select the selected template anatomies from a collection of anatomies by: for each of the collection of anatomies, using the processor to determine a difference between a skin mesh of the anatomy comprising part of the collection and the skin mesh of the new anatomy; and using the processor to select the template anatomies based on the differences between the skin meshes of the collection of anatomies and the skin mesh of the new anatomy.

The method may further comprise using the processor to generate external parameters by parameterizing an exterior of each of the new and collection of anatomies by performing principal components analysis on vertex positions of the skin meshes of the new and collection of anatomies to determine body eigenvectors for each of the new and collection of anatomies. The differences between the skin meshes of the collection of anatomies and the skin mesh of the new anatomy may be determined using the external parameters.

For each of the collection of anatomies, the processor may determine the difference between the skin mesh of the anatomy comprising part of the collection and the skin mesh of the new anatomy by using the processor to determine a Euclidean (L2) distance.

The selected anatomies may be the anatomies from the collection that have skin meshes least different from the new anatomy.

Using the processor to interpolate the skeleton of the new anatomy may comprise performing a weighted interpolation of the skeletons of the selected template anatomies, wherein each of the skeletons of the selected template anatomies is assigned a weight that varies inversely with the difference between the skin mesh of the selected template anatomy and the skin mesh of the new anatomy.

The skeleton of each of the selected template anatomies may comprise joint locations and joint orientation parameters, and using the processor to interpolate the skeleton of the new anatomy may comprise: determining a weighted average, based on the weights of the selected template anatomies, of each of the joint locations and joint orientation parameters; and transferring the weighted average of each of the joint locations and joint orientation parameters of the selected template anatomies to the new anatomy.

The joint orientation parameters may comprise joint orientations.

The joint orientation parameters may comprise guide points, and using the processor to interpolate the skeleton of the new anatomy may further comprise determining joint orientations by orienting joints of the skeleton of the new anatomy according to the guide points.

Using the processor to interpolate the skeleton joint positions may comprise applying a Laplacian interpolation or Radial Basis Function interpolation to the selected template anatomies.

Each of the selected template anatomies may have a specific set of skinning weights, and using the processor to interpolate the skeleton of the new anatomy may comprise: determining a weighted average, based on the weights of the selected template anatomies, of the sets of skinning weights specific to each of the selected template anatomies; and transferring the weighted average of the sets of skinning weights to the new anatomy.

The selected template anatomies may share a set of skinning weights, and using the processor to interpolate the skeleton of the new anatomy may comprise assigning the set of skinning weights to the new anatomy.

The selected template anatomies may share a set of skinning weights, and using the processor to interpolate the skeleton of the new anatomy may comprise transferring the set of skinning weights shared by the selected template anatomies to the new anatomy.

The selected template anatomies may further share a second pose different from the first pose, and the method may further comprise using the processor to: for each of the selected template anatomies, determine a mesh deformation gradient for each polygon of the skin mesh of the selected template anatomy, the mesh deformation gradient corresponding to deformation of the polygon from the first pose to the second pose; for each set of corresponding polygons of the skin meshes of the selected template anatomies, determine a weighted average, based on the weights of the selected template anatomies, of the mesh deformation gradients; from the weighted averages of the mesh deformation gradients, determine a vertex displacement field for each of the polygons of the skin mesh of the new anatomy; and determine the skin mesh of the new anatomy in the second pose from the vertex displacement field for each of the polygons of the skin mesh of the new anatomy.

The new anatomy and each of the selected template anatomies may have skinning weights, and the method may further comprise using the processor to deform the new anatomy from the first pose to the second pose using the skeleton and skinning weights of the new anatomy. For each of the selected template anatomies, using the processor to determine the mesh deformation gradient for each polygon of the skin mesh of the selected template anatomy may comprise using the processor to: deform the selected template anatomy from the first pose to the second pose using the skeleton and skinning weights of the selected template anatomy; and then determine the mesh deformation gradient for each polygon of the skin mesh of the selected template anatomy. Using the processor to determine the skin mesh of the new anatomy in the second pose may comprise using the processor to adjust each of the polygons of the skin mesh of the new anatomy by the vertex displacement field for each of the polygons of the skin mesh of the new anatomy.

Using the processor to determine the vertex field for each of the polygons of the skin mesh of the new anatomy may comprises using the processor to determine the vertex field for each of the polygons as a vertex field that is within 10% of a vertex field that minimizes an average cumulative difference between the mesh deformation gradients of the skin mesh of the new anatomy and the selected template anatomies.

Each of the skin meshes of the selected template anatomies may comprise mesh regions and corresponding mesh regions across the selected template anatomies may be in correspondence, and using the processor to interpolate the new anatomy may comprise using the processor to determine vertex positions of mesh regions of the new anatomy as a weighted average, based on the weights of the selected template anatomies, of vertex positions of the corresponding mesh regions across the selected template anatomies.

According to another aspect, there is provided an anatomy generated according to the method of any of the foregoing aspects or suitable combinations thereof.

According to another aspect, there is provided a system for generating a new anatomy, the system comprising: a display; an input device; a database storing selected template anatomies; a processor communicatively coupled to the display, input device, and database; and a memory communicatively coupled to the processor, the memory having stored thereon computer program code, executable by the processor, which when executed by the processor causes the processor to perform the method of any of the foregoing aspects or suitable combinations thereof.

According to another aspect, there is provided a non-transitory computer readable medium having stored thereon computer program code, executable by a processor, which when executed by the processor causes the processor to perform the method of any of the foregoing aspects or suitable combinations thereof.

This summary does not necessarily describe the entire scope of all aspects. Other aspects, features and advantages will be apparent to those of ordinary skill in the art upon review of the following description of specific embodiments.

BRIEF DESCRIPTION OF THE DRAWINGS

In the accompanying drawings, which illustrate one or more example embodiments.

DETAILED DESCRIPTION

Conventionally generating an animation-ready anatomy is done substantially manually. For example, a visual artist may draw a skin mesh for the anatomy in various poses, and use those manually drawn poses as a basis for animating the anatomy. This type of process is labor intensive, inefficient, and scales poorly. Particularly for applications in which a large number of animation-ready anatomies is required, such as visual effects and gaming, manually generating animation-ready anatomies is consequently impractical.

The embodiments described herein are directed at methods, systems, and techniques for generating a new animation-ready anatomy. The new anatomy is generated based on a number of selected template anatomies, which may comprise a subset of a larger collection of anatomies. A skin mesh of the new anatomy is provided as input to a processor. The skin mesh may be automatically generated using, for example, a suitable scanner such as a depth camera, another type of digital camera (e.g., a digital single-lens reflex or mirrorless digital camera) to perform an external scan of a creature being modeled. The processor then interpolates one or both of a 1) personalized skeleton and skinning weights, and 2) the skin mesh in various poses of the new anatomy, and uses the interpolated data to make the anatomy animation-ready. The animation-ready anatomy may subsequently be animated on a display.

Figure 1:
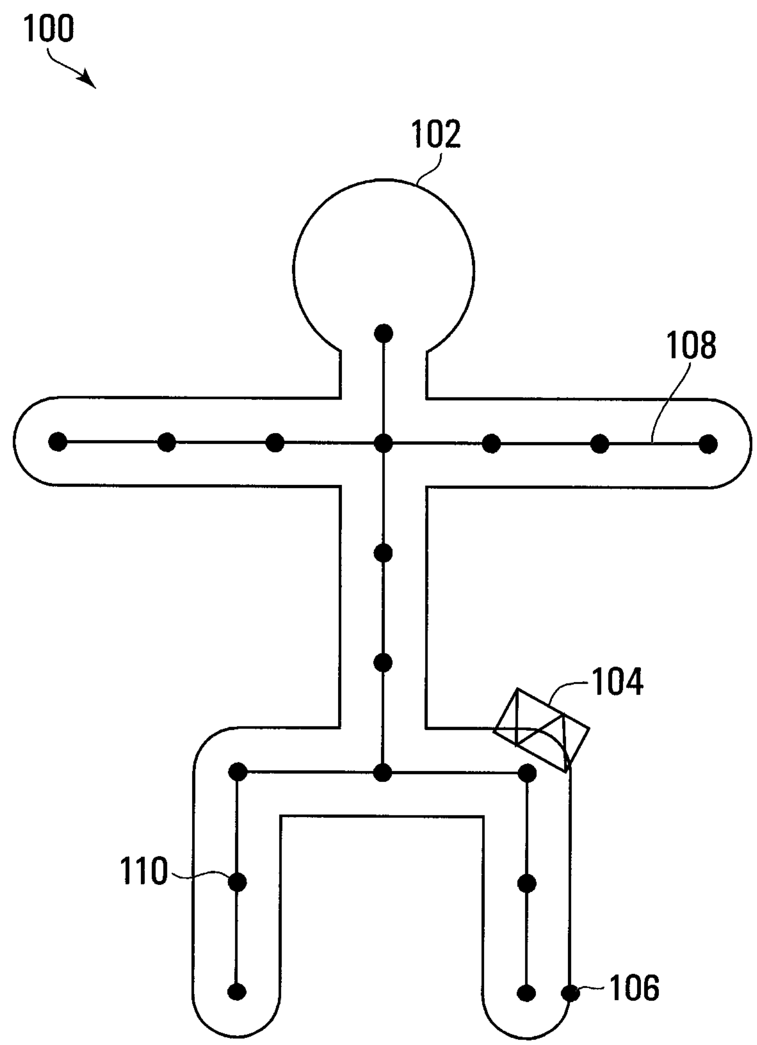
FIG. 1 depicts an animation-ready anatomy, according to one example embodiment.

Referring now to FIG. 1, there is shown an animation-ready anatomy 100 according to one example embodiment. The anatomy 100 shown in FIG. 1 is of a human, although generally speaking the anatomy 100 may be of any creature, such as a human, animal, or fantasy creature (e.g., dragon, hobbit, werewolf). The anatomy 100 comprises a skeleton 108 contained within a skin mesh 102. The skeleton 108 comprises bones 112 and joints 110; each joint 110 has a particular orientation defined at least in part by the angle made by the bones 112 converging at that joint 110. The shape of the skeleton 108 with its joints 110 at any given orientation defines the "pose" of the anatomy 100. The skin mesh 102 is the external mesh of the anatomy 100, and the "shape" of the anatomy 100 in a given pose is the shape defined by the skin mesh 102 at that pose. A "neutral pose" of the anatomy 100 is an arbitrary pose of the anatomy 100;

in one example, the neutral pose is the anatomy 100 in a pose representing the creature at rest; for example, when the creature is a human, the rest pose may be that human standing straight with his or her arms in a T-pose.

The anatomy 100 may be modeled based on a specific creature; for example, the skin mesh 102 of the anatomy 100 may be generated by taking a depth scan of that creature. When the anatomy 100 is modeled on a specific creature, that specific creature is referred to as the "subject" of that anatomy 100. An anatomy 100 that is for a specific subject is "customized" for that subject; when the subject is human, that anatomy 100 is "personalized" for that subject.

The skin mesh 102 of the anatomy 100 of FIG. 1 comprises one or more triangle meshes. Each of the vertices of the skin mesh 102 is associated with a skinning weight $w_i$ 106, where i identifies the vertex of the skin mesh 102 to which the skinning weight 106 applies, a representative one of which one is highlighted in FIG. 1. The triangle meshes are embedded within multiple tetrahedral mesh ("tet mesh") 104 regions; a portion of one of these regions 104 is highlighted in FIG. 1. In different embodiments (not depicted), the skin mesh 102 may be embedded within a mesh comprising one or more types of 3D elements, which may or may not be tetrahedral (e.g., they may be hexahedral).

An anatomy 100 is "animation-ready" if it comprises one or both of 1) a skeleton 108 with vertex weights, such as skinning weights 106, and 2) a skin mesh 102 in multiple poses. As the anatomy 100 in FIG. 1 comprises the skeleton 108 and skinning weights 106, it is animation-ready.

Figure 3:
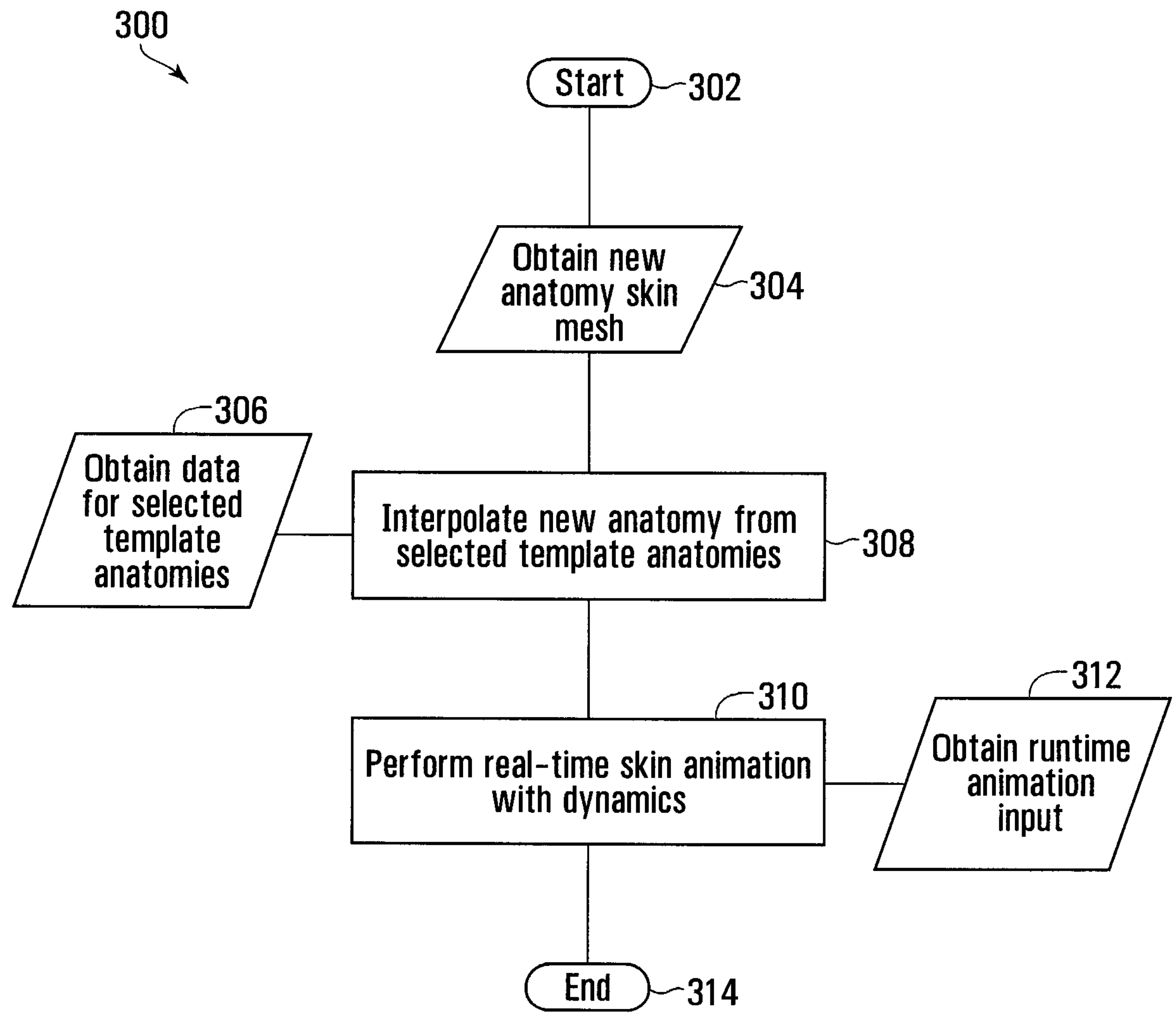
FIG. 3 depicts a method for generating a new animation-ready anatomy, according to another example embodiment.

Referring now to FIG. 3, there is depicted a method 300 for generating a new animation-ready anatomy 114, according to another example embodiment. The method 300 may be expressed as computer program code and be encoded on to a memory 512 (shown in FIG. 5) for execution by a processor 510 (shown in FIG. 5). The new anatomy 114 is generated by interpolating from selected template anatomies 200. The new anatomy 114 and the selected template anatomies 200 are examples of the anatomy 100 of FIG. 1.

The processor 510 begins performing the method at block 302 and proceeds to block 304 where it obtains the skin mesh 102 of the new anatomy 114. The skin mesh 102 represents the new anatomy 100 in a first pose, which in this example embodiment is the neutral pose when the subject is at rest. The processor 510 obtains the skin mesh 102 using 3D scanning equipment, such as the depth camera 518 (shown in FIG. 5). Alternatively or additionally, the skin mesh 102 may be modeled manually (e.g., be entirely hand drawn) or be generated automatically from, for example, body measurements. At block 302, the processor 510 does not have a skeleton 108 or skinning weights 106 for the new anatomy 114, and has only the skin mesh 102 for the neutral pose.

At block 306, the processor 510 obtains data for k selected template anatomies 200 that the processor 510 will use to interpolate the new anatomy 114. In this example embodiment, the selected template anatomies 200 comprise at least part of a larger collection of template anatomies 200 that is stored in a database 514 (shown in FIG. 5) with a database management system that permits users to create, query, administer, and perform similar operations on the database 514. In different embodiments, however, the collection of anatomies 200 may be stored in any suitable format, with or without a database management system or any ancillary software.

Figure 2:
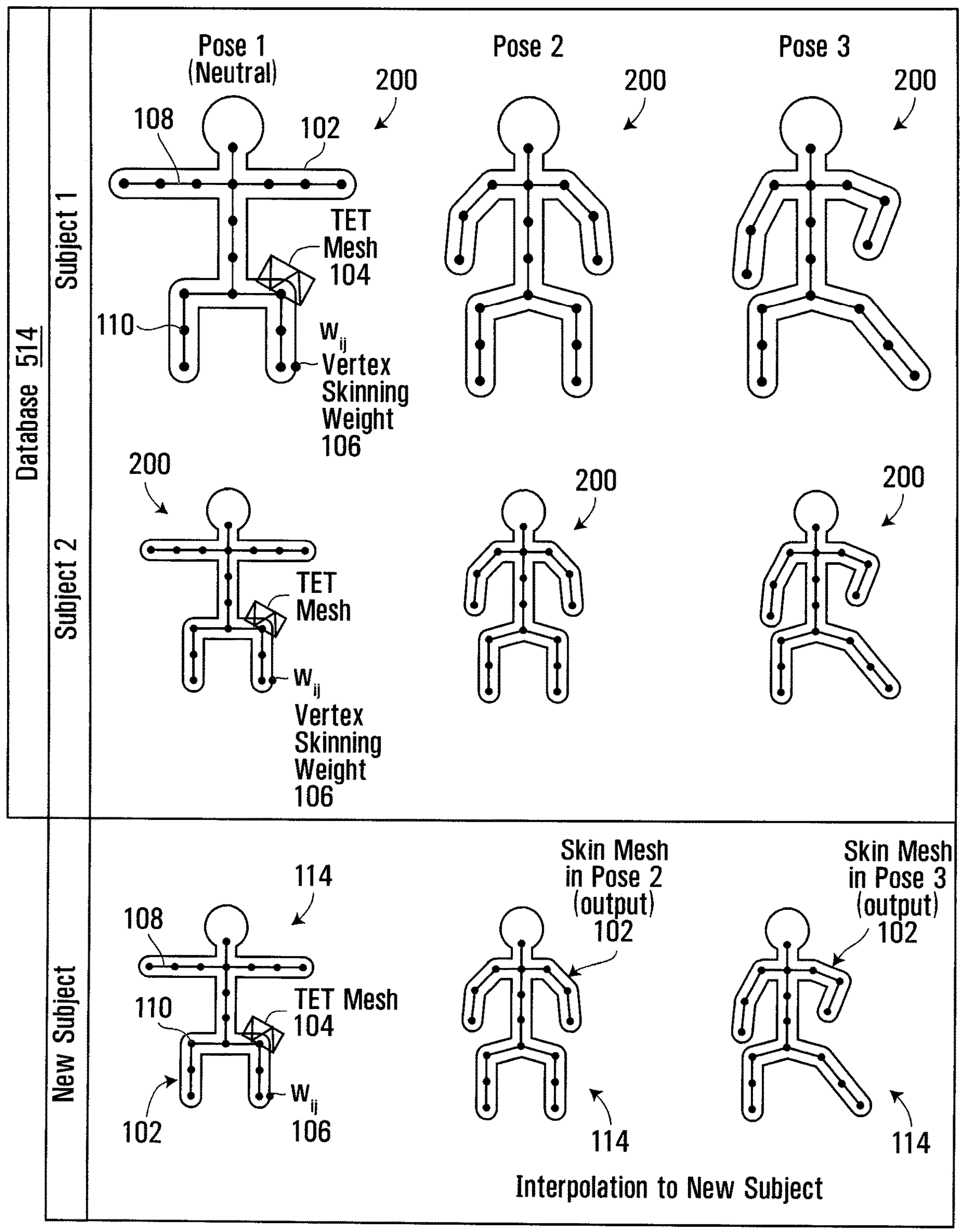
FIG. 2 depicts a new animation-ready anatomy and selected template simulation anatomies on which the new anatomy is based, according to another example embodiment.

FIG. 2 depicts two selected template anatomies 200*a,b*, each of which is shown in three different poses (poses 1-3). Pose 1 is the neutral pose, and poses 2 and 3 are two arbitrarily selected poses that are different from the neutral pose and from each other. Similar to the anatomy 100 of FIG. 1, each of the selected template anatomies 200*a,b* comprises a skeleton 108 and skinning weights 106 $w_{ij}$, where i identifies the vertex of the skin mesh 102 and j identifies the selected template anatomy 200*a,b*, respectively, to which the skinning weight 106 applies. Each of the selected template anatomies 200*a,b* is personalized to a different subject. Consequently, while they are in identical poses, their skeletons 108 and shapes differ.

While three example poses are depicted in FIG. 2, more generally the poses selected for the selected template anatomies 200 may comprise, for example, individually bending any one or more of the elbow, knee, shoulder, hip, wrist, ankle, spine, and neck segment of those anatomies 200, in one or more standardized increments such as, for example, 15 degrees. The standardization of the selected template anatomies' 200 poses in the database 514 may be performed by a database engineer before the database 514 is populated with the anatomies 200 in different poses. The shapes for the different anatomies 200 stored in the database 514 may then be generated using any suitable method, such as geometric modeling, 3D scanning using the depth camera 518 or another suitable scanner, or physically based simulation.

Each of the selected template anatomies 200 is animation-ready and comprises a skeleton 108 and vertex weights in the form of skinning weights 106. While each of the anatomies in FIG. 2 is available in the neutral pose and two additional poses, this may not be the case in different embodiments. For example, as discussed in further detail below, in different embodiments the selected template anatomies 200 may all share a single pose and comprise a skeleton 108 and vertex weights, or they may all share multiple poses and lack a skeleton 108 and vertex weights.

Prior to moving to block 308, the processor 510 confirms that the skin mesh 102 of the new anatomy 114 and the skin meshes 102 of the selected template anatomies 200 are in correspondence with each other; that is, the processor 510 confirms those meshes 102 have the same numbers of vertices and polygons, and the same connectivity. If the meshes 102 are not initially in correspondence with each other, the processor 510 may place them in correspondence with each other using any one of several known techniques such as that described in, for example, the Iterative Closest Point Algorithm: Besl, Paul J.; N. D. McKay (1992). "*A Method for Registration of* 3-*D Shapes*". *IEEE Trans. on Pattern Analysis and Machine Intelligence.* 14 (2): 239-256.

At block 308, the processor 510 interpolates the animation-ready new anatomy 100 using the skin mesh 102 of the new anatomy 114 in the neutral pose and the selected template anatomies 200. The processor 510 performs this interpolation based on 1) the skeletons 108 and skinning weights 106 of the selected template anatomies 200, as discussed in further detail below in respect of FIG. 4A; and 2) the shapes of the selected template anatomies 200 in multiple poses, as discussed in further detail below in respect of FIG. 4B. The processor 510 does not require information on anatomy structures such as the fascia or muscles of the new or selected template anatomies 114,200 in order to generate the new anatomy 114. The more similar the new anatomy 114 is to the selected template anatomies 200, the closer the quality of new anatomy is to that of the selected template anatomies 200.

As shown in FIG. 2, the processor 510 outputs the new anatomy 114 with an interpolated skeleton 108, tet mesh 104, and skinning weights 106, based on the skeletons 108, tet meshes 104, and skinning weights 106 of the selected template anatomies 200*a,b*, and in poses 1-3, based on poses 1-3 of the selected template anatomies 200*a,b*.

In different embodiments, the processor 510 may interpolate the new anatomy 114 based on either, instead of both of, 1) the skeletons 108 and skinning weights 106 of the selected template anatomies 200; and 2) the shapes of the selected template anatomies 200 in multiple poses. For example, if the processor 510 interpolates using only the skeletons 108 and skinning weights 106 in the database 514 of the selected template anatomies 200, the new anatomy 114 is generated in only the pose of the skin mesh 102 obtained at block 304 with an interpolated skeleton 108 and skinning weights 106. As another example, if the processor 510 interpolates using only the shapes of the selected template anatomies 200 in multiple poses, the new anatomy 114 is generated in those multiple poses, but without a skeleton 108 or skinning weights 106.

After the processor 510 creates the new anatomy 114, it proceeds to block 310 where it performs real-time skin animation, optionally with dynamics, on the new anatomy 100. The processor 510 may do this by applying any one or more animation methods to deform the new anatomy's 100 skin mesh 102 based on specific runtime input that the processor 510 obtains from block 312. This specific runtime input may comprise, for example, the subject's time-varying joint angles. Examples of animation methods that the processor 510 may apply on the new anatomy 100 comprise skinning (see, e.g., "*Skinning: Real-time Shape Deformation*", ACM SIGGRAPH 2014 Course), pose-space deformation ("PSD") (see, e.g., J. P. Lewis, Matt Cordner, Nickson Fond: *Pose space deformation: a unified approach to shape interpolation and skeleton-driven deformation*, ACM SIGGRAPH 2000), blend shape animation (see, e.g., Liu, Chen: *An Analysis of the Current and Future State of* 3D *Facial Animation Techniques and Systems*", MSc Thesis, Simon Fraser University, 2009), the finite element method ("FEM") (see, e.g., Eftychios Sifakis and Jernej Barbic: *FEM Simulation of* 3D *Deformable Solids: A practitioner's guide to theory, discretization and model reduction*, ACM SIGGRAPH 2012 Courses), and model reduction (see, e.g., Jernej Barbič, Doug L. James: *Real-Time Subspace Integration for St. Venant-Kirchhoff Deformable Models*, ACM Transactions on Graphics 24(3) (SIGGRAPH 2005), p. 982-990; and Hongyi Xu and Jernej Barbič: *Pose-Space Subspace Dynamics*, ACM Transactions on Graphics 35(4) (SIGGRAPH 2016)).

For example, when applying skinning, the processor 510 uses the skeleton 108 and skinning weights 106 to deform the new anatomy's 114 skin mesh 102, based on user-provided runtime joint angles. As another example, when applying PSD the processor 510 may augment skinning using the new anatomy's 114 shapes in poses 1-3. As another example, when applying blend shape animation, the processor 510 uses the shapes in poses 1-3, and combines them using user-provided runtime blendshape weights obtained from block 312. As another example, a PSD deformer may be combined with physically based tetrahedral mesh simulation to simulate skin dynamics. The PSD deformer is trained prior to use with the personalized skeleton 108, skinning weights 106, and shapes in poses 1-3 of the new anatomy 114. The processor 510 then determines the new anatomy's 114 skin dynamics by simulating the tet meshes comprising the skin mesh 102 using, for example, FEM simulation or model reduction.

Figure 4A:
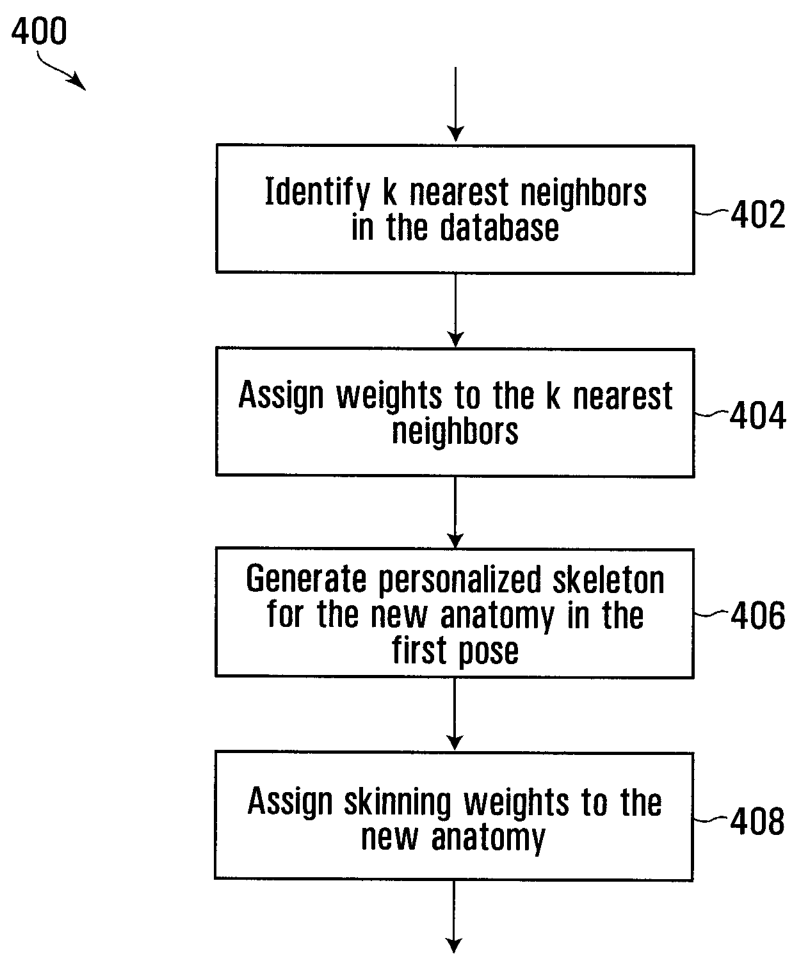
FIGS. 4A and 4B depict methods for generating a personalized skeleton and/or skin mesh for the new anatomy, according to additional example embodiments.
Figure 4B:
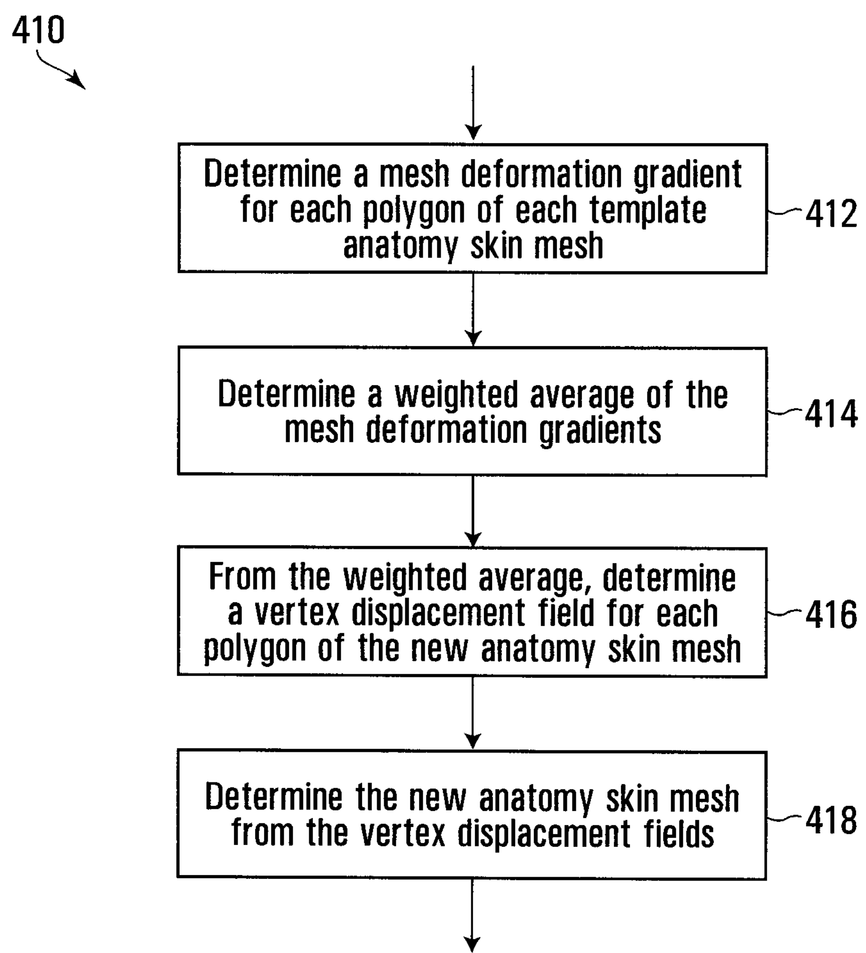

FIGS. 4A and 4B depict methods for interpolating the new anatomy 114 using the skeletons 108 and skinning weights 106 of the selected template anatomies 200, and using the poses of the selected template anatomies 200, respectively. In the example embodiment of FIGS. 2 and 3, the processor 510 uses both 1) the skeletons 108 and skinning weights 106 and 2) poses of the selected template anatomies 200 to interpolate the new anatomy 114. However, as described further below, in different embodiments the processor 510 may use either, instead of both of, 1) the skeletons 108 and skinning weights 106 and 2) poses of the selected template anatomies 200 to interpolate the new anatomy 114.

Interpolating Using Skeletons and Skinning Weights

FIG. 4A shows a method 400 for interpolating the new anatomy 114 using the skeletons 108 and skinning weights 106 of the selected template anatomies 200, according to one example embodiment.

Database Nearest Neighbor Search and Weights Assignment

The processor 510 begins by searching the database 514 to identify the k selected template anatomies 200 that are the nearest neighbors to the new anatomy 114 (block 402). In one example embodiment, k=4. The processor 510 does this be determining, for each of the template anatomies 200 in the database 514, a difference between the skin meshes 102 of the new anatomy 114 and that template anatomy 200. The processor 510 in one embodiment determines this distance d between those meshes 102 by forming vectors of the meshes' 102 vertex positions P (for the new anatomy's 114 mesh 102) and Q (for the template anatomy's 200 mesh 102), and then determining a suitable standard distance measure between those vectors. For example, the processor may determine the $L_2$ distance between those vectors, where the $L_2$ distance is the square root of the sum of squared vector entry differences, $d=\sqrt{\sum_{i=1}^{3n} s_i(P_i-Q_i)^2}$, where n is the number of mesh vertices, i represents different vertices, and $s_i$ are suitable weights (e.g., $s_i=1$ for all i).

In another embodiment, the processor 510 parameterizes the template anatomies 200 in the database 514 using "eigenbody" coefficients as described in Brett Allen, Brian Curless, Zoran Popovic: *The space of human body shapes: reconstruction and parameterization from range scans, ACM SIGGRAPH* 2003. The processor 510 performs Principal Component Analysis ("PCA") on the skin mesh 102 vertex positions of the new and template anatomies 114,200. The principal eigenvectors, stored in a matrix U, and computed by having the processor 510 apply PCA, are called "eigenbodies" and are the dominant variations of the body shape away from the average body shape. The processor 510 then determines projections $p=U^TP$, and $q=U^TQ$, and then determines the distance as $d=\sqrt{\sum_{i=1}^{r}(p_i-q_i)^2}$. Because the projections p and q are low-dimensional, this embodiment has the advantage that the processor 510 can perform the nearest neighbor search relatively quickly and more robustly, which is useful for large databases of anatomies 200.

Once the processor 510 determines the distances, it performs the nearest neighbor search using any suitable nearest-neighbor search method, such as a kd-tree or by selecting as the k nearest neighbors the k anatomies 200 having the k shortest distances to the new anatomy 114.

Following identification of the k nearest neighbors, the processor 510 assigns weights $w_1, \ldots, w_k$ to those neighbors (block 404). The weights in certain example embodiments sum to 1.0. In certain example embodiments, the processor 510 determines the weights such that $w_i$ is inversely proportional to the distance between the new anatomy's 100 skin mesh 102 and the $i^{th}$ nearest neighbor, for example, by using Shepard's weights (see, e.g., Shepard, Donald: *A*

*two-dimensional interpolation function for irregularly-spaced data*. Proceedings of the 1968 ACM National Conference. pp. 517-524).

Skeleton Generation

After identifying the k nearest neighbors and assigning each of those neighbors a weight, in the embodiment of FIG. 4A the processor 510 generates a personalized skeleton 108 for the new anatomy 114 by interpolating based on the skeletons 108 of those k nearest neighbors (block 406). The processor 510 determines the new anatomy's 100 joint positions and orientations.

The processor 510 determines the new anatomy's 114 joint positions as follows. For each of the k nearest neighbors, the processor 510 transfers the joint positions of the selected template anatomy's 200 skeleton 108 to the new anatomy 114, using either Laplace interpolation or Radial Basis Function ("RBF") interpolation, as described below. The processor 510 then weight averages the transferred joint positions using the weights assigned at block 404, with the resulting average being the new anatomy's 114 joint positions.

The Laplacian transformation from any one of the selected template anatomies 200 to the new anatomy 114 is performed by minimizing a Laplacian energy on a tetrahedral mesh of the volume enclosed by the neutral skin mesh of the selected template anatomy 200, subject to a displacement constraint that vertices of that anatomy 200 are to align with the vertices the new anatomy 114, as described in Dicko Ali-Hamadi, Tiantian Liu, Benjamin Gilles, Ladislav Kavan, Francois Faure, Olivier Palombi, Marie-Paule Cani: *Anatomy Transfer*, SIGGRAPH 2013. Once the processor 510 determines the tet mesh vertex displacement field that minimizes this optimization problem, it uses it to determine the transferred positions of all the joints.

The RBF transformation from any one of the selected template anatomies 200 to the new anatomy 114 is performed by solving for the kernel centers and weights of an RBF network that displaces the neutral skin vertices of the selected template anatomy 200 onto neutral skin vertices of the new anatomy 114. The processor 510 then uses the resulting RBF displacement field to determine the transferred positions of all the joints of the selected template anatomy 200.

To determine the orientations of the new anatomy's 114 joints 110, the joint orientations of the selected template anatomies 200 are first determined. In one embodiment, orientations for some or all of the template anatomies' 200 joints 110 may be set manually. Additionally or alternatively, a template rig may be used whereby the orientations of those anatomies' 200 joints 110 are determined based on positions of guide points and by applying an orientation procedure. An orientation procedure comprises determining the orientation of a joint 110 by aligning one or more axes of that joint with one or more respective guide points located outside of that joint 110. As an example of an orientation procedure for the shoulder joint, the first axis of the shoulder joint is designed to point to the elbow connected to the shoulder by the upper arm, which is achieved by placing a guide point to the elbow and instructing the joint orientation procedure to orient the first axis of the shoulder toward that guide point. Using a template rig in this manner facilitates expressing, for example, standard aim and up skeleton constraints.

During the population of the database 514, the processor 510 transfers the guide points from one of the template anatomies 200 in the database 514 to all of the other template anatomies 200 in the database 514, in the same way as the skeleton joint positions. The processor 510 also transfers the template joint orientations onto all anatomies 200 in the database 514. The processor 510 does this by determining the deformation gradient of the transfer map at every joint position, extracting its rotational part Q using polar decomposition (Ken Shoemake and Tom Duff: *Matrix animation and polar decomposition*, Proceedings of the conference on Graphics interface '92, p. 258-264), and then rotating the template orientation by Q. The processor 510 then uses the transferred orientations and the guide points to perform the orientation procedure, to arrive at the final joint orientations for each of the template anatomies 200 in the database 514.

The processor 510 transfers the guide points from the k nearest neighbors onto the skin mesh 102 of the new anatomy 114. It then weight-averages the transferred guide points, producing the final guide point positions for the new anatomy 114. The processor 510 analogously weight-averages the joint orientations of those k nearest neighbors, and converts the result into a rotation matrix using polar decomposition. The processor 510 then uses the transferred and averaged orientations and guide points to perform the orientation procedure, to arrive at the final joint orientations for the new anatomy 114.

Skinning Weights

The processor 510 subsequently assigns skinning weights to the new anatomy 114 (block 408). In one example embodiment, the skinning weights 106 are generated once for the database 514, using any suitable skinning weight generation method. Because the vertices of the different anatomies 200 in the database 514 are in correspondence, the processor 510 in one example embodiment copies a single set of weights 106 to all the anatomies 200 in the database 510, and also to the new anatomy 114.

In a different embodiment, personalized skinning weights 106 may be prepared for any one or more of the template anatomies 200 and the new anatomy 114. The processor 514 then generates personalized skinning weights 106 for the new anatomy 114 by interpolating them from the k nearest neighbor template anatomies 200. Specifically, if the skinning weight of a mesh vertex with respect to bone b in the nearest neighbor i is $s_{bi}$, then the skinning weight of the same vertex in the novel subject equals $\Sigma_{i=1}^{k} w_i s_{bi}$.

Interpolating Using Poses

FIG. 4B shows a method 410 for interpolating the new anatomy 114 using the poses of the selected template anatomies 200, according to one example embodiment. This may be done additionally or alternatively to the method 400 of FIG. 4A. When done alternatively to the method 400 of FIG. 4A, the method 410 of FIG. 4B is supplemented by performing at least block 402 (identifying k nearest neighbors) prior to block 412.

Generating Personalized Shapes in Standardized Body Poses

Given the skin mesh 102 of the new anatomy 114, the processor 510 automatically determines the personalized shapes for poses of the new anatomy corresponding to the poses of the template anatomies 200 used to interpolate the new anatomy 114. For example, in FIG. 2, applying the method of FIG. 4B generates poses 1-3 of the new anatomy 114 based on poses 1-3 of the template anatomies 200. While poses 1-3 are shown in FIG. 2B, other poses, such as blendshapes, are used in at least some other embodiments. The processor 510 does this by applying deformation transfer, as described in Robert W. Sumner, Jovan Popovic. *Deformation Transfer for Triangle Meshes*. ACM SIGGRAPH 2004, modified to permit interpolation of shapes from k≥1 anatomies 200 as described below.

Let $F_t(u)$ be the deformation gradient of the new anatomy's 114 skin mesh's 102 triangle t between the neutral pose and the same mesh 102 where its vertices are displaced by a displacement field u and $F_t^i(u)$ denote the same quantity for the mesh 102 of the nearest neighbor i ($1 \le i \le k$). For each nearest neighbor i, let $u_j^i$ denote the displacement field between the mesh 102 of the neutral pose of the nearest neighbor i and a different standardized pose j. The processor 510 determines the mesh deformation gradient $F_{tj}^i = F_t^i(u_j^i)$ of each skin mesh 102 triangle t (block 412). The processor 510 then determines a weighted average of the mesh deformation gradients $\overline{F}_{tj} = \Sigma_{i=1}^{k} w_i F_{tj}^i$ ("target deformation gradients") (block 414) and, separately for each pose j, determines the vertex displacement field $u_1$ of the skin mesh 102 of the new anatomy 114 in the neutral pose that minimizes the average difference to the target deformation gradients (block 416), $$\min_{u_j} \sum_{t=1}^{\#triangles} \|F_t(u_j) - \overline{F}_{tj}\|_2^2 \text{ subject to } C(u_j) = c.$$

The constraint $C(u_j)=c$ fixes the translational degrees of freedom. For example, it can be formed by constraining the centroid (or a weighted centroid based on user-provided vertex weights) of the deformed skin mesh 102 to the centroid of the neutral pose, or by imposing a constraint that keeps the skeleton root in the same position as in the neutral pose. The processor 510 adjusts the shape of the new anatomy 114 using the vertex displacement field (block 418). The method 410 accordingly results in the personalized shapes corresponding to the standardized poses for the new anatomy 114.

In another embodiment, skinning may be applied to improve the quality of the above method when the new anatomy 114 also comprises a transferred skeleton 108 and skinning weights 106. In this embodiment, the processor 510 first uses the transferred skeleton 108 and skinning weights 106 of the new anatomy 114 to deform the new anatomy's 114 skin mesh 102 into a representative pose P. The processor 510 then deforms the skin meshes 102 of the k nearest neighbors into that pose P, also by only using skinning. For each nearest neighbor i, the processor 510 determines the deformation gradients between the skinned mesh 102 in pose P, and the actual mesh 102 stored in the database 514 for that neighbor i at pose P. The processor 510 then weight-averages these deformation gradients (as described in the above), forming the target deformation gradients for each triangle of the skin mesh 102. It then determines the vertex deformations of the new anatomy 114 away from the representative pose P that minimizes the average difference to the target deformation gradients. The minimizing vertex deformations are added to the skinned pose of the new anatomy 114 in pose P, obtaining its final shape in pose P. In this embodiment, the transferred deformations in each pose are smaller and more local, which improves the transfer results.

While the vertex displacement field of the new anatomy 114 skin mesh 102 is minimized in the above examples, in different embodiments that field need not be minimized. For example, it may be within 5%, 10%, 15%, 20%, or 25% of a vertex field that minimizes an average cumulative difference between the mesh deformation gradients of the skin mesh 102 of the new anatomy 114 and the selected template anatomies 200.

While the foregoing describes mesh deformation gradients in respect of triangles of the skin mesh 102, more generally non-triangle polygons may be used (e.g., quadrilaterals). Further, in alternative embodiments mesh deformation gradients and related vertex deformations may be based on regions of the skin mesh 102 comprising multiple polygons. Additionally, while in certain embodiments the mesh deformation gradients may be assigned different weights when averaging them as described above, in other embodiments the gradients may be assigned equal weights.

Personalized Tet Meshes for Real-Time Dynamics

The method described thus far is static and deterministic: for each pose, it produces one shape, devoid of any skin dynamics. The processor may additionally or alternatively produce one or more personalized tetrahedral meshes for the new anatomy 114, for use in real-time skin dynamic animation. As described above, FEM or model reduction may be applied to actually perform the animation.

Stored in the database 514 for each of the template anatomies 200 is $N \ge 0$ tetrahedral meshes 104. One anatomy 200 may have more than one tet mesh 104 because the skin mesh 102 can be separated into more than one dynamic region, with a separate tetrahedral mesh for each region. The tetrahedral meshes 104 *x*, for any $1 \le x \le N$, are in vertex correspondence across all the anatomies 200 in the database 514, and consequently share the same number of tetrahedra and have the same mesh connectivity. The processor 510 personalizes the N tet meshes 104 to the new anatomy 114, as follows. For each mesh 104 *x*, the processor 510 combines $x^{th}$ tet mesh 104 of all the k-nearest neighbors into one tet mesh 104. The processor 510 performs this by weight-averaging the vertex positions of the tetrahedral mesh 104 *x* of all the k nearest neighbors, for each vertex, in a manner analogous to the weight averaging described above. The processor 510 may also determine material properties such as Young's modulus or Poisson's ratio for the new anatomy's 114 tet meshes 104 as a weighted-average of the same properties of the nearest neighbors k in the database 514.

The embodiments have been described above with reference to flowcharts and block diagrams of methods, apparatuses, systems, and computer program products. In this regard, the flowcharts and block diagrams of FIGS. 3, 4A, and 4B illustrate the architecture, functionality, and operation of implementations of various embodiments. For instance, each block of the flowcharts and block diagrams may represent a module, segment, or portion of code, which comprises one or more executable instructions for implementing the specified action(s). In some alternative embodiments, the action(s) noted in that block may occur out of the order noted in those figures. For example, two blocks shown in succession may, in some embodiments, be executed substantially concurrently, or the blocks may sometimes be executed in the reverse order, depending upon the functionality involved. Some specific examples of the foregoing have been noted above but those noted examples are not necessarily the only examples. Each block of the block diagrams and flowcharts, and combinations of those blocks, may be implemented by special purpose hardware-based systems that perform the specified functions or acts, or combinations of special purpose hardware and computer instructions.

Each block of the flowcharts and block diagrams and combinations thereof can be implemented by computer program instructions. These computer program instructions may be provided to a processor of a computer, such as one particularly configured to anatomy generation or simulation, or other programmable data processing apparatus to produce a machine, such that the instructions, which execute via the processor of the computer or other programmable data processing apparatus, create means for implementing the actions specified in the blocks of the flowcharts and block diagrams.

These computer program instructions may also be stored in a computer readable medium that can direct a computer, other programmable data processing apparatus, or other devices to function in a particular manner, such that the instructions stored in the computer readable medium produce an article of manufacture including instructions that implement the actions specified in the blocks of the flowcharts and block diagrams. The computer program instructions may also be loaded onto a computer, other programmable data processing apparatus, or other devices to cause a series of operational steps to be performed on the computer, other programmable apparatus, or other devices to produce a computer implemented process such that the instructions that execute on the computer or other programmable apparatus provide processes for implementing the actions specified in the blocks of the flowcharts and block diagrams.

Figure 5:
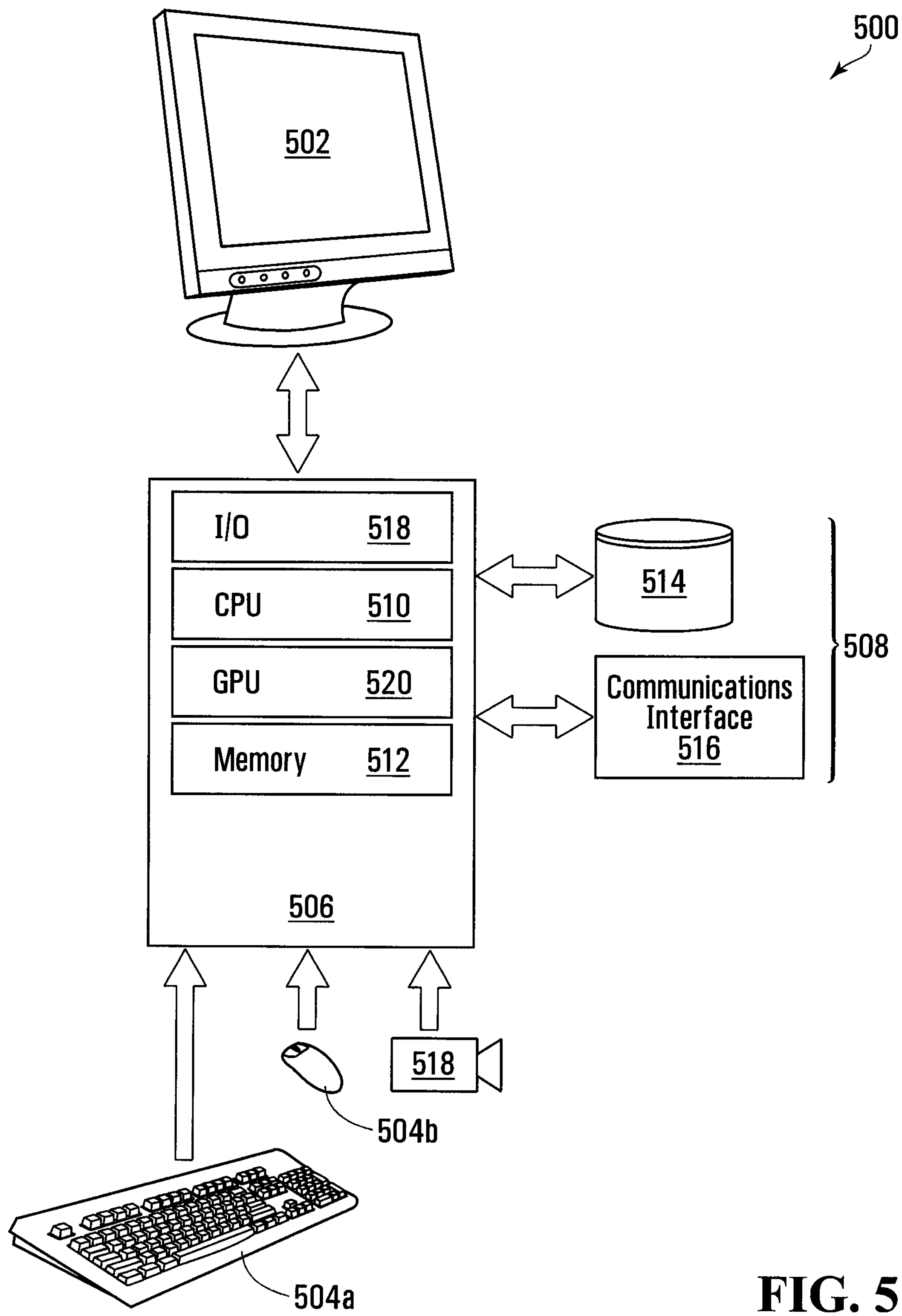
FIG. 5 depicts a system for generating a new animation-ready anatomy, according to another embodiment.

An illustrative computer system 500 in respect of which the methods herein described may be implemented is presented as a block diagram in FIG. 5. The computer system 500 comprises a display 502; input devices in the form of keyboard 504*a*, pointing device 504*b*, and depth camera 518; computer 506; and external devices 508. While the pointing device 504*b* is depicted as a mouse, other types of pointing devices may also be used. In alternative embodiments (not depicted), the computer system 500 may not comprise all the components depicted in FIG. 5.

The computer 506 may comprise one or more processors or microprocessors, such as the processor (central processing unit, or "CPU") 510, which is depicted. The processor 510 performs arithmetic calculations and control functions to execute software stored in an internal memory 512, such as one or both of random access memory ("RAM") and read only memory ("ROM"), and possibly additional memory 514. The additional memory 514 may comprise, for example, mass memory storage, hard disk drives, optical disk drives (including CD and DVD drives), magnetic disk drives, magnetic tape drives (including LTO, DLT, DAT and DCC), flash drives, program cartridges and cartridge interfaces such as those found in video game devices, removable memory chips such as EPROM or PROM, emerging storage media, such as holographic storage, or similar storage media as known in the art. This additional memory 514 may be physically internal to the computer 506, or external as shown in FIG. 5, or both.

The computer system 500 may also comprise other similar means for allowing computer programs or other instructions to be loaded. Such means can comprise, for example, a communications interface 516 that allows software and data to be transferred between the computer system 500 and external systems and networks. Examples of the communications interface 516 comprise a modem, a network interface such as an Ethernet card, a wireless communication interface, or a serial or parallel communications port. Software and data transferred via the communications interface 516 are in the form of signals which can be electronic, acoustic, electromagnetic, optical, or other signals capable of being received by the communications interface 516. Multiple interfaces, of course, can be provided on the computer system 500.

Input to and output from the computer 506 is administered by the input/output (I/O) interface 518. The I/O interface 518 administers control of the display 502, keyboard 504*a*, depth camera 518, external devices 508, and other analogous components of the computer system 500. The computer 506 also comprises a graphical processing unit ("GPU") 520. The GPU 520 may also be used for computational purposes as an adjunct to, or instead of, the processor 510, for mathematical calculations. However, as mentioned above, in alternative embodiments (not depicted) the computer system 500 need not comprise all of these elements.

The various components of the computer system 500 are coupled to one another either directly or indirectly by shared coupling to one or more suitable buses.

The terminology used herein is for the purpose of describing particular embodiments only and is not intended to be limiting. Accordingly, as used herein, the singular forms "a", "an", and "the" are intended to include the plural forms as well, unless the context clearly indicates otherwise. It will be further understood that the terms "comprises" and "comprising", when used in this specification, specify the presence of one or more stated features, integers, steps, operations, elements, and components, but do not preclude the presence or addition of one or more other features, integers, steps, operations, elements, components, and groups. Directional terms such as "top", "bottom", "upwards", "downwards", "vertically", and "laterally" are used in the following description for the purpose of providing relative reference only, and are not intended to suggest any limitations on how any article is to be positioned during use, or to be mounted in an assembly or relative to an environment. Additionally, the term "couple" and variants of it such as "coupled", "couples", and "coupling" as used in this description are intended to include indirect and direct connections unless otherwise indicated. For example, if a first device is coupled to a second device, that coupling may be through a direct connection or through an indirect connection via other devices and connections. Similarly, if the first device is communicatively coupled to the second device, communication may be through a direct connection or through an indirect connection via other devices and connections.

It is contemplated that any part of any aspect or embodiment discussed in this specification can be implemented or combined with any part of any other aspect or embodiment discussed in this specification.

In construing the claims, it is to be understood that the use of computer equipment, such as a processor, to implement the embodiments described herein is essential at least where the presence or use of that computer equipment is positively recited in the claims.

One or more example embodiments have been described by way of illustration only. This description is been presented for purposes of illustration and description, but is not intended to be exhaustive or limited to the form disclosed. It will be apparent to persons skilled in the art that a number of variations and modifications can be made without departing from the scope of the claims.

The invention claimed is:

1. A method for generating a new anatomy, the method comprising using a processor to, at least:

obtain a skin mesh of the new anatomy;

select template anatomies from a collection of anatomies by, for each of the collection of anatomies, determine a difference between a skin mesh of each anatomy comprising part of the collection of anatomies and the skin mesh of the new anatomy and select the template anatomies based on the differences between the skin meshes of the collection of anatomies and the skin mesh of the new anatomy;

obtain selected template anatomies each comprising a skin mesh that is in correspondence with the skin mesh of the new anatomy, wherein the skin mesh of the new anatomy and the skin meshes of the selected template anatomies share a first pose and wherein each of the selected template anatomies further comprises at least one of a skeleton for the first pose and skinning weights and the skin mesh for each of the selected template anatomies in at least one additional pose that is different from the first pose and any other additional poses;

interpolate, from at least one of the skeleton for the first pose and the skinning weights of the selected template anatomies and the first pose and the at least one additional pose of the selected template anatomies, a skeleton of the new anatomy, wherein using the processor to interpolate the skeleton of the new anatomy comprises performing a weighted interpolation of the skeletons for the first pose of the selected template anatomies, wherein each of the skeletons for the first pose of the selected template anatomies is assigned a weight that varies inversely with a difference between the skin mesh of each selected template anatomy and the skin mesh of the new anatomy;

wherein the selected template anatomies further share a second pose different from the first pose, the method further comprising using the processor to, for each of the selected template anatomies, determine a mesh deformation gradient for each polygon of the skin mesh of each selected template anatomy, the mesh deformation gradient corresponding to deformation of each polygon of the skin mesh of each selected template anatomy from the first pose to the second pose, for each set of corresponding polygons of the skin meshes of the selected template anatomies, determine a weighted average, based on the weights of the selected template anatomies, of the mesh deformation gradients for each set of the corresponding polygons of the skin meshes of the selected template anatomies, determine a vertex displacement field for each polygon of the skin mesh of the new anatomy, and determine the skin mesh of the new anatomy in the second pose from the vertex displacement field for each polygon of the skin mesh of the new anatomy.

2. The method of claim 1, wherein using the processor to obtain the skin mesh of the new anatomy comprises using a scanning device to scan an individual to generate the skin mesh of the new anatomy, and wherein using the processor to obtain the selected template anatomies comprises accessing a database storing the selected template anatomies.

3. The method of claim 1, further comprising using the processor to generate external parameters by parameterizing an exterior of each of the new anatomy and the collection of anatomies by performing principal components analysis on vertex positions of the skin mesh of the new anatomy and the skin meshes of the collection of anatomies to determine body eigenvectors for each of the new anatomy and the collection of anatomies, and wherein the differences between the skin meshes of the collection of anatomies and the skin mesh of the new anatomy are determined using the external parameters.

4. The method of claim 1, wherein using the processor to determine the difference between the skin mesh of each anatomy comprising part of the collection of anatomies and the skin mesh of the new anatomy comprises using the processor to determine a Euclidean (L2) distance.

5. The method of claim 1, wherein the selected template anatomies are anatomies from the collection of anatomies that have skin meshes least different from the new anatomy.

6. The method of claim 1, wherein the skeleton for the first pose of each of the selected template anatomies comprises joint locations and joint orientation parameters, and wherein using the processor to interpolate the skeleton of the new anatomy comprises determining a weighted average, based on the weights of the selected template anatomies, of each of the joint locations and the joint orientation parameters and transferring the weighted average of each of the joint locations and the joint orientation parameters of the selected template anatomies to the new anatomy.

7. The method of claim 6, wherein the joint orientation parameters comprise joint orientations.

8. The method of claim 6, wherein the joint orientation parameters comprise guide points, and wherein using the processor to interpolate the skeleton of the new anatomy further comprises determining joint orientations by orienting joints of the skeleton of the new anatomy according to the guide points.

9. The method of claim 6, wherein using the processor to interpolate the skeleton of the new anatomy comprises applying a Laplacian interpolation or Radial Basis Function interpolation to the selected template anatomies.

10. The method of claim 1, wherein each of the selected template anatomies has a specific set of skinning weights, and wherein using the processor to interpolate the skeleton of the new anatomy comprises determining a weighted average, based on the weights of the selected template anatomies, of the specific sets of skinning weights for each of the selected template anatomies and transferring the weighted average of the specific sets of skinning weights to the new anatomy.

11. The method of claim 1, wherein the selected template anatomies share a set of skinning weights, and wherein using the processor to interpolate the skeleton of the new anatomy comprises assigning the set of skinning weights to the new anatomy.

12. The method of claim 1, wherein the selected template anatomies share a set of skinning weights, and wherein using the processor to interpolate the skeleton of the new anatomy comprises transferring the set of skinning weights shared by the selected template anatomies to the new anatomy.

13. The method of claim 1, wherein the new anatomy and each of the selected template anatomies have the skinning weights, and further comprising using the processor to deform the new anatomy from the first pose to the second pose using the skeleton of the new anatomy and the skinning weights of the new anatomy, wherein for each of the selected template anatomies, using the processor to determine the mesh deformation gradient for each polygon of the skin mesh of each selected template anatomy comprises using the processor to deform each selected template anatomy from the first pose to the second pose using the skeleton for the first pose and the skinning weights of each selected template anatomy and determine the mesh deformation gradient for each polygon of the skin mesh of each selected template anatomy, wherein using the processor to determine the skin mesh of the new anatomy in the second pose comprises using the processor to adjust each polygon of the skin mesh of the new anatomy by the vertex displacement field for each polygon of the skin mesh of the new anatomy.

14. The method of claim 1, wherein using the processor to determine the vertex displacement field for each polygon of the skin mesh of the new anatomy comprises using the processor to determine a vertex displacement field that is within 10% of a vertex displacement field that minimizes an average cumulative difference between mesh deformation gradients of the skin mesh of the new anatomy and the mesh deformation gradients for each set of the corresponding polygons of the skin meshes of the selected template anatomies.

15. The method of claim 1, wherein each of the skin meshes of the selected template anatomies comprises mesh regions and corresponding mesh regions across the selected template anatomies are in correspondence, and wherein using the processor to interpolate the skeleton of the new anatomy comprises using the processor to determine vertex positions of mesh regions of the new anatomy as a weighted average, based on the weights of the selected template anatomies, of vertex positions of the corresponding mesh regions across the selected template anatomies.

16. The method of claim 1, wherein using the processor to interpolate the skeleton of the new anatomy includes interpolating a post of the skeleton of the new anatomy.

17. A system for generating a new anatomy, the system comprising:

a display;

an input device;

a database;

a processor communicatively coupled to the display, input device, and database; and a memory communicatively coupled to the processor, the memory having stored thereon computer program code, executable by the processor, which when executed by the processor causes the processor to perform operations comprising:

obtaining a skin mesh of the new anatomy;

selecting template anatomies from a collection of anatomies by, for each of the collection of anatomies, determining a difference between a skin mesh of each anatomy comprising part of the collection of anatomies and the skin mesh of the new anatomy and selecting the template anatomies based on the differences between the skin meshes of the collection of anatomies and the skin mesh of the new anatomy;

obtaining selected template anatomies each comprising a skin mesh that is in correspondence with the skin mesh of the new anatomy, wherein the skin mesh of the new anatomy and the skin meshes of the selected template anatomies share a first pose and wherein each of the selected template anatomies further comprises at least one of a skeleton for the first pose and skinning weights and the skin mesh for each of the selected template anatomies in at least one additional pose that is different from the first pose and any other additional poses, and interpolating, from at least one of the skeleton for the first pose and the skinning weights of the selected template anatomies and the first pose and the at least one additional pose of the selected template anatomies, a skeleton of the new anatomy, wherein the interpolating of the skeleton of the new anatomy comprises performing a weighted interpolation of the skeletons for the first pose of the selected template anatomies, wherein each of the skeletons for the first pose of the selected template anatomies is assigned a weight that varies inversely with a difference between the skin mesh of each selected template anatomy and the skin mesh of the new anatomy;

wherein the selected template anatomies further share a second pose different from the first pose, the operations further comprising, for each of the selected template anatomies, determining a mesh deformation gradient for each polygon of the skin mesh of each selected template anatomy, the mesh deformation gradient corresponding to deformation of each polygon of the skin mesh of each selected template anatomy from the first pose to the second pose, for each set of corresponding polygons of the skin meshes of the selected template anatomies, determine a weighted average, based on the weights of the selected template anatomies, of the mesh deformation gradients for each set of the corresponding polygons of the skin meshes of the selected template anatomies, determine a vertex displacement field for each polygon of the skin mesh of the new anatomy, and determine the skin mesh of the new anatomy in the second pose from the vertex displacement field for each polygon of the skin mesh of the new anatomy.

18. A non-transitory computer readable medium having stored thereon computer program code, executable by a processor, which when executed by the processor causes the processor to perform operations for generating a new anatomy, the operations comprising:

obtaining a skin mesh of the new anatomy;

select template anatomies from a collection of anatomies by, for each of the collection of anatomies, determine a difference between a skin mesh of each anatomy comprising part of the collection of anatomies and the skin mesh of the new anatomy and select the template anatomies based on the differences between the skin meshes of the collection of anatomies and the skin mesh of the new anatomy;

obtaining selected template anatomies each comprising a skin mesh that is in correspondence with the skin mesh of the new anatomy, wherein the skin mesh of the new anatomy and the skin meshes of the selected template anatomies share a first pose and wherein each of the selected template anatomies further comprises at least one of a skeleton for the first pose and skinning weights and the skin mesh for each of the selected template anatomies in at least one additional pose that is different from the first pose and any other additional poses; and interpolating, from at least one of the skeleton for the first pose and the skinning weights of the selected template anatomies and the first pose and the at least one additional pose of the selected template anatomies, a skeleton of the new anatomy, wherein the interpolating of the skeleton of the new anatomy comprises performing a weighted interpolation of the skeletons for the first pose of the selected template anatomies, wherein each of the skeletons for the first pose of the selected template anatomies is assigned a weight that varies inversely with a difference between the skin mesh of each selected template anatomy and the skin mesh of the new anatomy;

wherein the selected template anatomies further share a second pose different from the first pose, the operations further comprising, for each of the selected template anatomies, determine a mesh deformation gradient for each polygon of the skin mesh of each selected template anatomy, the mesh deformation gradient corresponding to deformation of each polygon of the skin mesh of each selected template anatomy from the first pose to the second pose, for each set of corresponding polygons of the skin meshes of the selected template anatomies, determine a weighted average, based on the weights of the selected template anatomies, of the mesh deformation gradients for each set of the corresponding polygons of the skin meshes of the selected template anatomies, determine a vertex displacement field for each polygon of the skin mesh of the new anatomy, and determine the skin mesh of the new anatomy in the second pose from the vertex displacement field for each polygon of the skin mesh of the new anatomy.

* * * * *